United States Patent [19]
Peterson et al.

[11] 3,872,317
[45] Mar. 18, 1975

[54] MEANS FOR SELECTING AN ADAPTIVE BRAKING SYSTEM CONTROLLING SPEED SIGNAL

[75] Inventors: Steven H. Peterson; Ralph W. Carp; Harold E. Weissler, all of Newport News, Va.

[73] Assignee: The Bendix Corporation, Southfield, Mich.

[22] Filed: Apr. 2, 1974

[21] Appl. No.: 457,317

[52] U.S. Cl. .................................. 307/10 R, 317/5
[51] Int. Cl. .............................................. B60t 8/08
[58] Field of Search ..................... 307/10 R; 317/5; 303/21 CF, 21 B, 21 BE, 21 BB, 21 EB

[56] References Cited
UNITED STATES PATENTS
3,611,109  10/1971  Jones .............................. 303/21 CF
3,696,270  10/1972  Schnaibel et al. ...................... 317/5

Primary Examiner—Herman Hohauser
Attorney, Agent, or Firm—W. G. Christoforo; Bruce L. Lamb

[57] ABSTRACT

In an adaptive braking system for automobiles, trucks and the like, whose braking characteristics are to be automatically controlled wherein the rotational speed of at least two wheels is individually sensed so as to generate electrical signals related to wheel speed, means are described for selecting either the signal representing a higher speed wheel or the signal representing the lower speed wheel. The means is comprised basically of a latching gate which permits one or the other of the wheel speed signals to pass therethrough.

9 Claims, 4 Drawing Figures

MEANS FOR SELECTING AN ADAPTIVE BRAKING SYSTEM CONTROLLING SPEED SIGNAL

BACKGROUND OF THE INVENTION

This invention relates to adaptive braking systems for wheeled vehicles, also referred to as anti-lock systems, having select high and select low control logic of the type wherein the dynamic performance of at least two wheels are individually sensed and the performance of one of the sensed wheels is elected to control the adaptive braking in accordance with predetermined design criteria.

Adaptive brake control on an axle basis is generally used in certain adaptive braking systems because of its cost advantage when compared to a system having individual wheel control. It is generally desirable in an axle system that the speed of each wheel on the axle be individually sensed but that the brake pressure to all wheels on the axle be controlled by a single brake pressure modulator during adaptive braking.

The system designer normally has a choice of three types of such axle control systems, select low speed, select high speed, and select the average speed of all wheels on the axle. In addition, the type of axle control might remain constant as the vehicle in which the adaptive braking system is installed is exposed to varying environments. For example, the adaptive braking system might be designed to respond under all conditions to the low speed wheel. In more sophisticated adaptive braking systems, the type of control might change in accordance with the environment in which the vehicle is operating. For example, systems are known wherein the low speed wheel controls under certain conditions and the high speed wheel controls under other conditions, the change in the type of control being made automatically during the adaptive braking cycle. In any event, some means must be provided for generating at a predetermined terminal the desired speed signal.

As well known, wheel speed sensors have normally been of the tachometer type having a rotor which is ganged to and rotates in response to rotation of an associated wheel. A stator, in response to rotation of the rotor, generates a varying signal whose frequency is correlated to the sensed wheel rotational speed. One such sensor is normally provided for each sensed wheel. In the past, these varying signals generated by the wheel sensor have been processed by additional circuitry to generate a speed signal comprised of a d.c. voltage whose level is proportional to wheel rotational speed. In adaptive brake control systems on an axle basis where two such d.c. speed signals are generated, one corresponding to each of the sensed wheels, the signals are sorted in accordance with the voltage level, with the higher voltage level being available at a first terminal and the lower voltage level being available at a second terminal. One of the terminals can then be selected to control the adaptive braking system in accordance with system control logic.

SUMMARY OF THE INVENTION

It is known that the output signal from the wheel speed sensor is generally a sinusoidal like signal or pulse like signals, depending upon the exact configuration of the sensor, having a repetition frequency related to wheel rotational speed. It is desirable to sort these signals as soon as possible for two basic reasons. First, in adaptive braking systems wherein a d.c. speed signal is used to control, sorting of the speed signals before they are processed into d.c. signals eliminates one of the a.c. to d.c. converters required in earlier systems. Second, where a digital signal controls the adaptive braking system, no a.c. to d.c. converters are required so that sorting of the sensor output signals while the output signal is in the form of a pulsed speed signal is desirable and preferable.

To accomplish the function of this invention, the speed signal obtained from the wheel speed sensors are assumed to be comprised of a train of pulses having a pulse repetition frequency proportional to associated wheel rotational speed. These pulsed speed signals can be provided simply by using wheel speed sensors which generate the pulsed signals directly or in the case where the wheel speed sensors generate a sinusoidal output signal, the sinusoidal output signal can be limited and clipped to produce pulsed signals. The pulses of the various speed signals are then applied to a latching gate means wherein the signals are sorted.

It is thus an object of this invention to provide high and low speed signal sorting circuitry.

It is another object of this invention to provide a circuit of the type described which operates on digital principles.

A further object of this invention is to provide a circuit of the type described which is particularly suitable for use in an axle controlled adaptive braking system.

One more object of this invention is to provide a wheel speed signal sorting means for sorting two input wheel speed signals before the signals are reduced to d.c. format.

These and other objects of the invention will become apparent with the reading and understanding of the following description of the invention and the accompanying drawings.

DESCRIPTION OF THE PREFERRED EMBODIMENT

Figure 1:
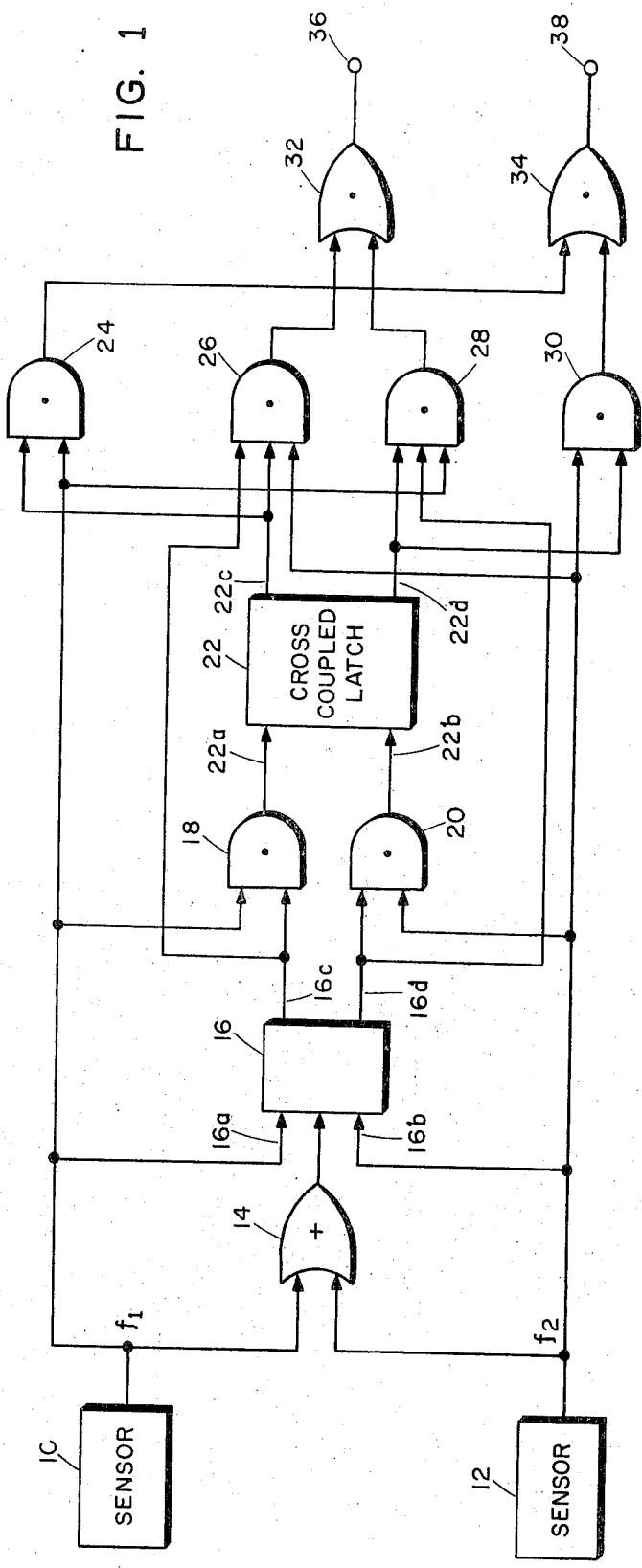
FIG. 1 is a block diagram which illustrates an embodiment of the invention.

Refer first to FIG. 1 where there are seen sensors 10 and 12. It is assumed in this particular embodiment that sensor 10 is ganged to one wheel on a particular vehicle axle while sensor 12 is ganged to the second wheel of the same axle. Each sensor generates a pulsed electrical output signal which is proportional to the speed of its associated wheel, these output signals being seen in simplified exemplary form as signals $f_1$ and $f_2$, respectively, of FIG. 2. The pulse repetition frequency of a signal generated by a sensor is proportional to the speed of its associated wheel. The $f_1$ and $f_2$ signals are applied as inputs to OR gate 14 whose output is applied to the toggle terminal of flip-flop 16, suitably of the JK type. In addition, the $f_1$ signal is applied to the flip-flop set input terminal 16a and the $f_2$ signal is applied to the flip-flop reset input terminal 16b. The flip-flop set output terminal 16c is applied as an input to AND gate 18 and also as an input to AND gate 26. The flip-flop reset output terminal is connected as an input to AND gate 20 and also as an input to AND gate 28. The $f_1$ signal is also applied as an input to AND gates 18, 24 and 28 while the $f_2$ signal is applied as an input to AND gates 20, 26 and 30. The gate 18 output terminal is connected to a cross coupled latch 22 set terminal 22a whose set output terminal is connected as an input to gates 24 and 26. In like manner, the output signal from gate 20 is connected to the reset input terminal 22b of cross coupled latch 22 whose reset output terminal 22d is connected as an input to gates 28 and 30. Cross coupled latch 22 is basically a flip-flop which generates an output at set output terminal 22c in response to the trailing edge of a signal at set terminal 22a and an output at reset output terminal 22d in response to the trailing edge of a signal at reset terminal 22b. The outputs from gates 26 and 28 are connected through OR gate 32 to output terminal 36 while the output terminals of gates 24 and 30 are connected through OR gate 34 to output terminal 38. It will be shown that the pulsed speed signal corresponding to the lower speed wheel will appear at terminal 36 while the pulsed speed signal corresponding to the higher speed wheel will appear at terminal 38.

Figure 2:
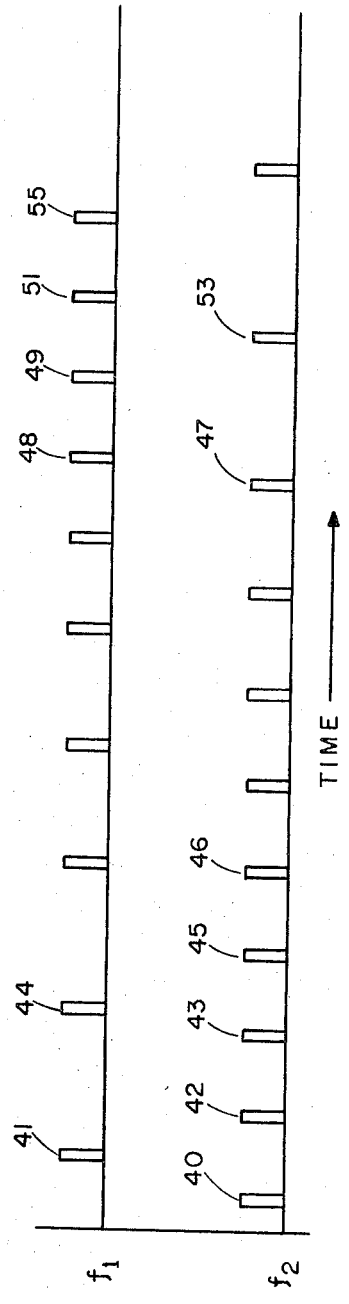
FIGS. 2 and 4 illustrate exemplary pulsed speed signals drawn to a common time scale and which are helpful in explaining the operation of the devices of FIGS. 2 and 3, respectively.

The operation of FIG. 1 will be explained with reference to FIG. 2 where the $f_2$ signal is shown at first having a repetition frequency approximately twice that of the $f_1$ signal, in other words, the wheel sensed by sensor 12 is at first rotating approximately twice the rotational speed as the wheel sensed by sensor 10. Subsequently, the wheel sensed by sensor 10 speeds up and the wheel sensed by sensor 12 slows down so that the signal $f_1$ becomes approximately twice the pulse repetition frequency of the signal $f_2$. A speed transitional interval between these two extremes of the speed signal is also shown. This transitional interval is compressed over that which might normally be expected in an actual system for convenience. In this embodiment, flip-flop 16 is triggered by the trailing edge of a signal at its toggle terminal. Assume first, that flip-flop 16 and latch 22 are in the reset state so that gates 20, 28 and 30 are qualified. Next, assume that the first pulse generated is pulse 40 in the $f_2$ pulse train generated by sensor 12. Since flip-flop 16 and latch 22 are already in the reset state, this pulse has no affect on these elements. However, the pulse passes through gates 30 and 34 and appears at terminal 38. The next pulse is pulse 41 of train $f_1$. This pulse passes through gate 14 to toggle flip-flop 16 into the set state at the trailing edge of the pulse since the set input terminal 16a is energized. However, due to the inherent delays in the action of flip-flop 16, the set output signal at 16c is not generated until shortly after the trailing edge of pulse 41. Hence, gate 18 remains closed during the occurrence of pulse 41 so that latch 22 remains in the reset state. Since flip-flop 16 is triggered at the trailing edge of a pulse, its reset output signal at 16d remains high during the occurrence of pulse 41 so that pulse can pass through gate 28 and through gate 32 to appear at terminal 36. The next pulse, pulse 42 of train $f_2$, causes flip-flop 16 to revert to the reset state and in addition passes through gates 30 and 34 and appears at terminal 38. As will be shown below, the circuit will remain in its current state, that is steering the pulses from sensor 10 to terminal 36 and the pulses from sensor 12 to terminal 38 until such time as two pulses are generated by sensor 10 between subsequent pulses from sensor 12. Thus, pulse 44 will appear at terminal 36 and pulses 45 and 46 will appear at terminal 38. After pulse 46, the wheel ganged to sensor 10 begins to speed up and the wheel ganged to sensor 12 slows down. This is illustrated by the fact that the pulses of signal $f_1$ begin to increase their repetition frequency while the pulses of signal $f_2$ tend to decrease their repetition frequency. During the transitional period, the pulses of signal $f_1$ and the pulses of signal $f_2$ are interleaved with one another. This causes flip-flop 16 to be alternately set and reset but does not affect the state of latch 22. Thus, the pulses of signal $f_1$ will continue to appear at terminal 36 and the pulses of signal $f_2$ will continue to appear at terminal 38 until after pulse 47, subsequent to which two pulses from signal $f_1$, pulses 48 and 49, occur before the next pulse of signal $f_2$, pulse 53. Pulse 47, of course, appears at terminal 38. Pulse 48 causes flip-flop 16 to toggle into the set state but does not affect latch 22, so that pulse 48 appears at terminal 36. Pulse 49 finds gate 18 open and passes therethrough to force latch 22 into the set state thus qualifying gates 24 and 26 and closing gates 28 and 30. Pulse 49 thus passes through gates 24 and 34 and appears at terminal 38, the $f_1$ signal which is generated by sensor 10 now corresponding to the rotational speed of the higher speed wheel. The next pulse, pulse 53, passes through gate 26 and 32 to appear at terminal 36. The circuit of FIG. 1 is thus forced into a new state wherein the pulses of signal $f_2$ now appear at terminal 36 and the pulses of signal $f_1$ appear at terminal 38. It should be noted that pulses of signal $f_2$ from pulse 40 to pulse 47 appear at terminal 38 and subsequent thereto pulses 49, 51 and 55 appear at that terminal. Note that pulse 48 does not appear at terminal 38. This fact is particularly important in adaptive braking systems which calculate wheel speed from the period of the speed signal pulses. Consider what would happen if the circuit was so configured that pulse 48 appeared at terminal 38. In this case, the period between pulses 47 and 48 would erroneously indicate that the speed of the highest speed wheel had attained an extremely high velocity. This erroneous signal could produce some anomaly in the speed determining signal which is fed by terminal 38. This anomaly is of course prevented by the circuitry of FIG. 1.

Figure 3:
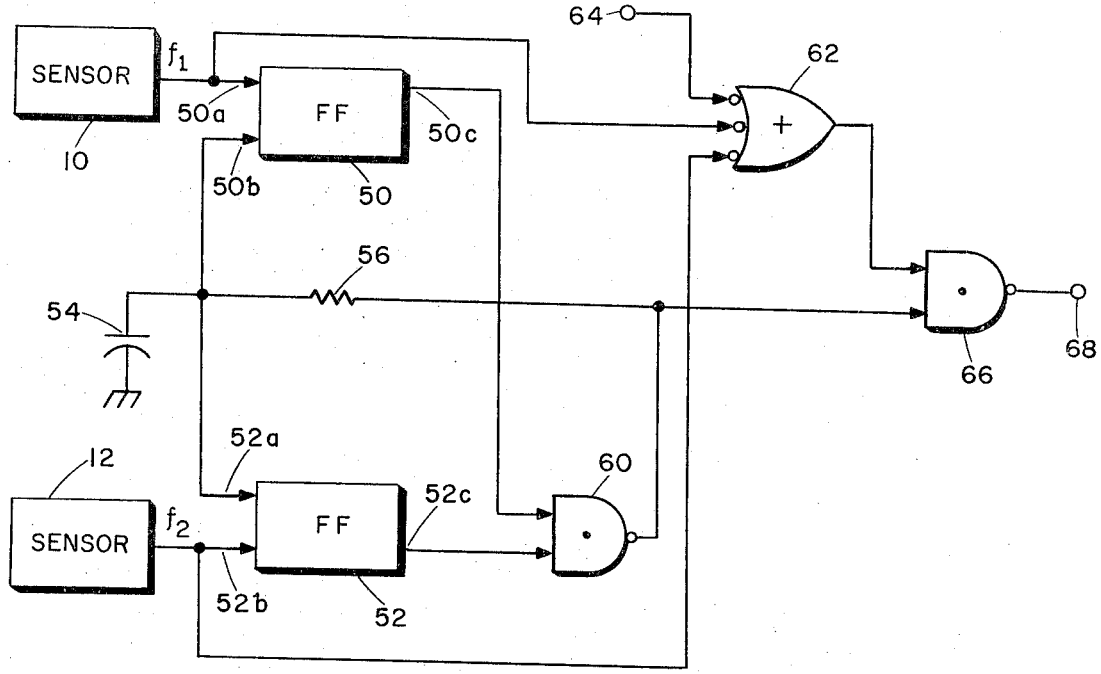
FIG. 3 is a block diagram of another embodiment of the invention wherein an external signal is applied to steer a selected one of the input speed signals to an output terminal.

Refer now to FIG. 3 which shows another embodiment of the invention wherein the signal at terminal 64 determines whether the pulse train corresponding to the slower rotating wheel or the pulse train related to the faster rotating wheel appears at output terminal 68. In this figure, sensors 10 and 12 are again seen and it is also assumed that sensor 10 generates a speed signal $f_1$ and sensor 12 generates a speed signal $f_2$. The $f_1$ signal is applied to the set input terminal 50a of cross coupled latch or flip-flop 50 and also as one input to NOR gate 62. Terminal 64 is connected as a second input to gate 62. The $f_2$ signal is applied to the reset input terminal 52b of cross coupled latch or flip-flop 52 and also as a third input to NOR gate 62. The set output terminal 50c of flip-flop 50 and the reset output terminal 52c of flip-flop 52 are applied as inputs to NAND gate 60. The output terminal from NAND gate 60 is applied as an input to NAND gate 66 which also receives the output from NOR gate 62 as an input. The output from gate 66 is impressed at terminal 68. The output terminal of NAND gate 60 is also applied to the delay circuit comprised of resistor 56 and capacitor 54 to the reset input terminal 50b of flip-flop 50 and the set input terminal 52a of flip-flop 52. The circuit logic is arranged in this embodiment so that a relatively low signal (logical 0) at terminal 64 permits the pulse speed signal corresponding to the lowest speed wheel to appear at terminal 68 and a relatively high signal (logical 1) at terminal 64 permits the pulse speed signal of the faster rotating wheel to appear at terminal 68. It should become obvious to one skilled in the art from a reading and understanding of this particular embodiment how modifications of the logic elements can produce other embodiments of the invention.

Figure 4:
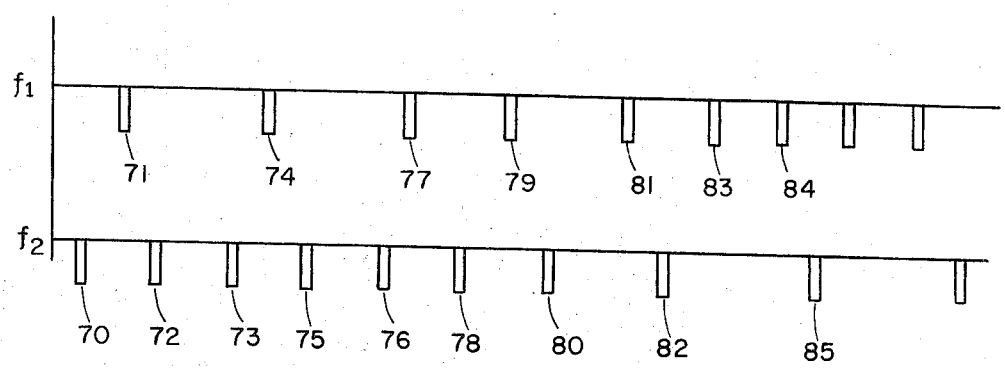

In this embodiment, it is assumed that the $f_1$ and $f_2$ signals are comprised of negative-going pulses or square waves. If these signals take other forms, it may be necessary for the system designer to substitute equivalent elements for the disclosed system elements, such as AND and OR gates, respectively, for the disclosed NAND and NOR gates. It is also assumed that flip-flops 50 and 52 generate relatively high output signals at terminals 50c and 52c, respectively, when the input signals at terminals 50a or 52a, respectively, are relatively low and a high output signal is extinguished when the signal at terminal 50b or 52b, respectively, goes low. Refer now also to FIG. 4 where signal $f_2$ is about twice the repetition frequency of signal $f_1$. Assume that a low signal is impressed at terminal 64. The resulting output from NOR gate 62 is high. Also assume that the first pulse received is pulse 70 of pulse train $f_2$ and that flip-flops 50 and 52 are in the reset state. In the condition assumed, gate 60 receives a relatively low input signal from flip-flop 50 and a relatively high input signal from flip-flop 52 and hence its output signal is relatively high whereby gate 66 receives two relatively high input signals so that a relatively low signal is at that time impressed at terminal 68. Pulse 70 has no affect upon flip-flop 52 since that flip-flop is already in the reset state and no affect upon gate 62. Accordingly, there is no affect on gate 66 so that the signal at terminal 68 remains low. The next pulse is pulse 71 of pulse train $f_1$, which pulse is applied as an input to NOR gate 62 and also triggers flip-flop 50 into its set state. The set output signal from this flip-flop passes through gate 60, which at that time is qualified due to the signal from flip-flop 52, to generate a relatively low signal at the output of gate 60. This low signal closes gate 66 so that a positive transition occurs at terminal 68 which corresponds to pulse 71. In addition, the output signal from gate 60 as delayed by resistor 56 and capacitor 54 subsequently resets flip-flop 50 and sets flip-flop 52 to thus extinguish the output signals from these flip-flops, removing the inputs to gate 60 and causing the output signal of that gate to now go high thereby opening gate 66 once again to terminate the positive-going pulse at terminal 68. The system is now in what can be termed its initial condition so that upon the occurrence of the subsequent pulse 72 of pulse train $f_2$ flip-flop 52 is reset to apply one relatively high input to gate 60. That gate does not as a result change state so that gate 66 does not change state and the signal at terminal 68 remains low. The response of the circuit to the next pulse, pulse 73, is identical to the response of the circuit to pulse 70. Accordingly, the signal at terminal 68 does not change in response to pulse 73. The response of the circuit to the subsequent pulses with the signal at terminal 64 relatively low should now be obvious, with pulses 74 and 77 of signal $f_1$ resulting in corresponding positive-going pulses at terminal 68 and pulses 75 and 76, for example, producing no response at terminal 68. It can thus be seen that with the signal at terminal 64 low the pulse speed signal corresponding to the lower speed wheel is in effect reproduced at terminal 68.

Subsequent to pulse 78, that is, the next pulse of signal $f_2$, the wheel ganged to sensor 10 begins to speed up and the wheel ganged to sensor 12 begins to slow down so that pulses 79 and 81 of the $f_1$ signal are interleaved with pulses 78, 80 and 82 of the $f_2$ signal. With alternate pulses of each train being now produced the circuit will not change state but continues in the same manner to generate pulses at terminal 68 corresponding to the pulses of signal $f_1$. Between pulses 82 and 85 of signal $f_2$, two consecutive pulses of that signal, however, two pulses of signal $f_1$ occur, pulses 83 and 84. Pulse 83, as before, returns the circuit to the initial condition and a corresponding pulse is generated at terminal 68. The next pulse, pulse 84, sets flip-flop 50, but gate 60 does not change state since there is no input to that gate at this time from flip-flop 52. The next pulse, pulse 85, resets flip-flop 52 thus causing gate 60 to change state to generate a pulse corresponding to pulse 85 at terminal 68 and in addition, returning the circuit to the initial condition. Thereafter, pulses corresponding to the pulses of signal $f_2$ will be generated at terminal 68 until the circuit again changes state, which will occur when two pulses of the $f_2$ train occur between consecutive pulses of signal $f_1$.

Now assume that the signal at terminal 64 is relatively high. Also assume flip-flops 50 and 52 reset. Assume again that the first pulse received is pulse 70 of pulse train $f_2$. This pulse, as before, has no affect upon flip-flop 52 since that flip-flop is already reset, hence the output from NAND gate 60 remains high. Pulse 70, however, is also applied through NOR gate 62 onto gate 66, which at this time is qualified, to produce a negative-going transition at terminal 68. At the trailing edge of pulse 70, gate 66 closes so that the signal at terminal 68 returns to its relatively high state. There is thus generated at terminal 68 a negative-going pulse corresponding to pulse 70. Upon the occurrence of the next pulse, pulse 71 of train $f_1$, flip-flop 50 is set and its set output signal is applied to gate 60 which in response generates a relatively low signal at its output. This maintains gate 66 closed so that pulse 71 which also is applied as an input to NOR gate 62 and passes therethrough cannot pass through gate 66. Thus, the signal at terminal 68 is not altered by pulse 71. In addition, the negative-going transition at the output of gate 60 produced by pulse 71 as delayed by resistor 56 and capacitor 54 returns the circuit to its initial condition. It should now be obvious that subsequent pulses in the $f_2$ train, for example pulses 72, 73, 75 and 76 will result in corresponding negative-going pulses at terminal 68 while subsequent pulses in the $f_1$ train, for example pulses 74 and 77, will produce no response at terminal 68 while the signal at terminal 64 is high. The circuit will continue to generate pulses at terminal 68 corresponding to the pulses of signal $f_2$ until the circuit changes state, which occurs, as before, when two pulses of signal $f_1$ are produced between consecutive pulses of signal $f_2$, at which time pulses corresponding to the pulses of signal $f_1$ will be generated at terminal 68.

Although these embodiments have been described with respect to certain logic elements, it should be obvious to one skilled in the art that the essence of the invention does not depend upon the exact form of the logic element shown. For example, where the polarity of the speed signal pulses differs from that described, it should be obvious to one skilled in the art that the invention can be still practiced by altering, when necessary, the form of the flip-flop or the gates used to produce the desired results. For example, and not by way of limitation, an AND gate can be substituted for a NAND gate and an OR gate may be substituted for a NOR gate or vice-versa as necessitated by the exact requirements of the circuit environment. The invention is thus to be limited only by the true scope and spirit of the appended claims.

The invention claimed is:

1. An adaptive braking system for a wheeled vehicle comprising:
   means for generating a first signal comprised of a train of pulses having a repetition frequency proportional to the speed of a first vehicle wheel;
   means for generating a second signal comprised of a train of pulses having a repetition frequency proportional to the speed of a second vehicle wheel;
   at least one output terminal;
   latch means having first and second states for generating at said output terminal an output signal having a repetition frequency equal to the repetition frequency of a predetermined one of said first and second signals when in said first state and for generating at said output terminal an output signal having a repetition frequency equal to the repetition frequency of the other of said first and second signals when in said second state, said latch means being responsive to a predetermined sequence of consecutive pulses of said first and second trains to latch in said first state and responsive to a second predetermined sequence of consecutive pulses of said first and second signals to latch in said second state.

2. The adaptive braking system of claim 1 wherein said first and second vehicles wheels are on the same vehicle axle.

3. The adaptive braking system of claim 1 including a second output terminal, said latch means when in said first and second states generating at said second output terminal an output signal having a repetition frequency correlated to the repetition frequency of the one of said first and second signals whose repetition frequency is not correlated to the repetition frequency of the signal generated at said at least one output terminal.

4. The adaptive braking system of claim 3 wherein the repetition frequency of the signal generated at said at least one output terminal is equal to the repetition frequency of one of said first and second signals and wherein the repetition frequency of the signal generated at said second output terminal is equal to the repetition frequency of the other of said first and second signals.

5. The adaptive braking system as recited in claim 1 wherein the repetition frequency of the signal generated at said at least one output terminal is equal to the repetition frequency of the signal to which it is correlated.

6. In an adaptive braking system for a wheeled vehicle, signal steering means comprising:
   means for generating a first signal comprised of a train of pulses having a repetition frequency proportional to the speed of a first vehicle wheel;
   means for generating a second signal comprised of a train of pulses having a repetition frequency proportional to the speed of a second vehicle wheel;
   at least one output terminal;
   latch means having first and second states for generating at said output terminal an output signal having a repetition frequency correlated to the repetition frequency at a predetermined one of said first and second signals when in said first state and for generating at said output terminal an output signal having a repetition frequency correlated to the repetition frequency of the other of said first and second signals when in said second state, said latch means being responsive to the appearance of consecutive pulses of one of said first and second signals without the intervening appearance of a pulse of the other of said first and second signals to latch in said first state.

7. The signal steering means of claim 6 wherein said latch means is additionally responsive to the appearance of consecutive pulses of the other of said first and second signals without the intervening appearance of a pulse of said one of said first and second signals to latch in said second state.

8. The steering means of claim 7 including a second output terminal, said latch means when in said first and second states generating at said second output terminal an output signal having a repetition frequency correlated to the repetition frequency of the one of said first and second signals whose repetition frequency is not correlated to the repetition frequency of the signal generated at said at least one output terminal.

9. In an adaptive braking system for wheeled vehicles, signal steering means comprising:
   means for generating a first signal comprised of a train of pulses having a repetition frequency proportional to the speed of a first vehicle wheel;
   means for generating a second signal comprised of a train of pulses having a repetition frequency proportional to the speed of a second vehicle wheel;
   at least one output terminal;
   means for generating a third signal having a first and a second sense;
   latch means having first and second states for generating at said output terminal an output signal having a repetition frequency correlated to the repetition frequency of a predetermined one of said first and second signals when in said first state and for generating at said output terminal an output signal having a repetition frequency correlated to the repetition frequency of the other of said first and second signals when in said second state, said latch means being responsive to said third signal when of the first sense and to a predetermined sequence of consecutive pulses of said first and second train to latch in said first state and responsive to the third signal of said second sense and to a predetermined sequence of consecutive pulses of said first and second signals to latch in said second state.

* * * * *